United States Patent [19]
Simmons

[11] Patent Number: 5,836,594
[45] Date of Patent: *Nov. 17, 1998

[54] SNOWMOBILE SKI

[75] Inventor: Verlin M. Simmons, Providence, Utah

[73] Assignee: Simmons, Inc., Provident, Utah

[*] Notice: This patent issued on a continued prosecution application filed under 37 CFR 1.53(d), and is subject to the twenty year patent term provisions of 35 U.S.C. 154(a)(2).

[21] Appl. No.: 213,950

[22] Filed: Mar. 15, 1994

Related U.S. Application Data

[63] Continuation-in-part of Ser. No. 88,411, Jul. 1, 1993, Pat. No. 5,360,220, which is a continuation-in-part of Ser. No. 988,231, Dec. 9, 1992, abandoned.

[51] Int. Cl.$^6$ ................................................. B62B 17/00
[52] U.S. Cl. .................................................................. 280/28
[58] Field of Search .............................. 280/28, 845, 608, 280/609

[56] References Cited

U.S. PATENT DOCUMENTS

| | | | |
|---|---|---|---|
| 3,675,939 | 7/1972 | Vik | 280/28 |
| 3,785,448 | 1/1974 | Merenheimo et al. | 280/28 X |
| 3,817,544 | 6/1974 | Labelle | 280/28 |
| 3,844,367 | 10/1974 | Flohr | 280/28 X |
| 3,901,525 | 8/1975 | O'Brien et al. | 280/14 |
| 4,116,455 | 9/1978 | Dotson et al. | 280/7.12 |
| 4,869,336 | 9/1989 | Nakaski et al. | 280/28 X |
| 5,344,168 | 9/1994 | Olson et al. | 280/28 |
| 5,360,220 | 11/1994 | Simmons | 280/28 |

FOREIGN PATENT DOCUMENTS

| | | | |
|---|---|---|---|
| 396225 | 4/1909 | France | 280/28 |
| 2662610 | 12/1991 | France | 280/28 |

*Primary Examiner*—Richard M. Camby
*Attorney, Agent, or Firm*—Madson & Metcalf

[57] ABSTRACT

A snowmobile ski having a front portion the bottom of which is slightly concave. On each side of the middle portion of the snowmobile ski there is a downwardly extending longitudinal side portion. At the front of each downwardly extending longitudinal side portion are located a forward-facing horizontal wedge and a forward-facing vertical wedge. At the rear of each downwardly extending longitudinal side portion are placed a rear-facing horizontal wedge and a rear-facing vertical wedge. A flexible loop is attached to, and mounted flush with, the bottom of the front portion of the snowmobile ski. The flexible loop curves in front of, and above, the front portion of the snowmobile ski, before being slidably attached to the top of the front portion of the snowmobile ski. The middle portion of the snowmobile ski is thicker than either the front portion or the rear portion of the snowmobile ski.

20 Claims, 2 Drawing Sheets

SNOWMOBILE SKI

CROSS-REFERENCE TO RELATED APPLICATION

This is a continuation-in-part of U.S.Pat. application Ser. No. 08/088,411, filed Jul. 1, 1993, now U.S. Pat. No. 5,360,220 which is a continuation-in-part of application Ser. No. 07/988,231 filed Dec. 9, 1992, now abandoned.

BACKGROUND OF THE INVENTION

1. Field of the Invention

This invention relates to skis used on snowmobiles and similar vehicles to support such vehicles, to facilitate their movement across snow and ice, and to provide directional guidance for them.

2. Description of the Related Art

Desirable characteristics of a snowmobile ski include the abilities to float on deep snow; to turn efficiently, including smoothly moving in a lateral direction; to move smoothly forward; to be flexible in order to minimize the possibility of the ski's catching on snow, ice, or obstacles; to move smoothly in reverse; to avoid creating fluid dynamic drag in snow; and to be structurally strong.

Prior patents have attempted to achieve these goals in various ways.

To increase flotation some skis have sides which extend farther downward than does any other portion of the bottom of the ski. These tend to prevent snow being forced outward from the sides of the ski when weight is placed on such ski.

U.S. Pat. No. 905,704 shows a runner for a sled, which it designates a "shoe," having a central longitudinal depression apparently running its entire length. U.S. Pat. No. 3,734,221 includes a ski with a longitudinally extending central groove that creates a concave shape and appears to extend throughout the length of the ski. U.S. Pat. No. 3,901,525 utilizes a concave "runner" which lies below a flexible structure and forms the base of the ski over its full length. U. S. Pat. No. 4,116,455 utilizes runners with a triangular cross section that are so large they effectively create downward extending sides of a ski termed a "shoe" over the entire length of the ski. U.S. Pat. No. 4,161,323, in one embodiment, has a ski with a central protuberance and a runner below it as well as on the sides of the ski, creating two semi-concave surfaces terminated by the side runners; two such skis are combined with the front ski having its protuberance running from near its back end forwardly "a fair distance" but preferably not to the upward curve of the front end and with the protuberance on the rear ski located near its front end. U.S. Pat. No. 4,225,145 includes an embodiment of a runner for a modified skateboard which has a concave surface at all locations where the bottom of the runner will contact snow over which the skateboard is operated. U.S. Pat. No. 4,413,832 covers a sled worn by a user; the portion worn on the trunk of the user's body has guiding edges which curve down from its sides and "run the length of the sled surface". And U.S. Pat. Nos. 5,040,818 and 5,145,201 depict a snowmobile ski possessing a unique double concave bottom over a length that is unstated but, from the description and figures, would seem to cover at least all of the bottom of the ski except, possibly, the extreme front and back portions.

Flotation is also augmented by having a flat bottom surface between the sides over the entire length of a ski, as in the case of the skis in U.S. Pat. Nos. 4,116,455 and the portion of the snow sled from U.S. Pat. No. 4,413,832 that is worn on the user's trunk.

And the upwardly and outwardly tapered side walls of the ski from U.S. Pat. No. 4,116,455 assist flotation during turns, when the ski rolls somewhat to its side.

The efficiency of turning is increased by the flotation during the turn discussed with respect to U.S. Pat. No. 4,116,455 and by those skis discussed above which possess downwardly extending sides. The downwardly extending sides, especially when they do not form part of a uniform curve across the bottom of the ski, keep snow from sliding away to the side as the ski is rolled slightly to create—from the weight of the snowmobile or the user—a horizontal component of force to aid in turning just as does a banked or superelevated curve on a highway.

On ice or hard-packed snow the ski cannot partially roll into the ice or snow; so, turning is primarily accomplished by yawing the ski in the desired direction and thereby creating frictional forces to direct the snowmobile or user in the desired direction. To increase the effectiveness of this process, metal guide rods are placed longitudinally on the bottom of the ski and, preferably, on the edges since either on a snowmobile or a human skier, the ski tends to roll in a turn and will, therefore, simply lift the guide rod above the snow or ice, as with the ski of U.S. Pat. No. 3,734,221, if the guide rod is not at the edge of the ski. U.S. Pat. No. 4,161,323 includes such guide rods on the sides, as well as in the middle, of the ski.

Of course, smooth movement of a ski laterally facilitates yawing and, therefore, turning of the ski. This can be accomplished through a variety of techniques: having the front end of the skis curved upward as do virtually all skis; maintaining the bottom of the rear of the ski flat, as in U.S. Pat. Nos. 5,040,818 and 5,145,201; and curving the bottom of the rear of the ski upward, as in U.S. Pat. Nos. 5,145,201, 5,040,818, and 3,734,221 as well as in one embodiment of U.S. Pat. No. 4,116,455.

Smooth movement in the reverse direction is facilitated by curving the top and bottom of the rear of the ski upward, as has been done with the skis of the four patents identified at the end of the preceding paragraph, and by rounding the rear corners of the ski, as is the case with the skis of U.S. Pat. Nos. 5,145,201; 5,040,818; and 3,734,221. These same features minimize the creation of fluid dynamic drag in snow.

Finally, the downward-extending sides discussed with respect to flotation also create a stronger structure than does a simply flat ski.

SUMMARY OF THE INVENTION

The present invention utilizes new techniques to achieve the desirable characteristics of a snowmobile ski that have been enumerated above.

Flotation is enhanced by forming the base of the ski so that as it moves across snow, the snow is funneled to the middle portion of the ski. This is accomplished by two techniques. The bottom of the upwardly curved forward portion of the ski is slightly concave. And, near the juncture of the front portion and the middle portion of the ski, the sides edges of the ski begin to extend downward in such a manner that, as viewed from below, on each side of the ski the downwardly extending longitudinal side portion forms a forward-facing horizontal wedge with its apex on the edge of the ski.

Efficient turning is facilitated by limiting the downwardly extending longitudinal side portions of the ski to the middle portion of the ski, unlike the skis of the prior art patents identified above where the downward extensions exist along all or substantially all the length of the skis. Such a limitation reduces resistance to yawing, i.e., laterally turning the ski.

Smooth forward movement is aided by placing, on each side of the ski near the juncture of the front portion and the middle portion of the ski, a forward-facing vertical wedge with its apex on the bottom of the front portion of the ski.

Flexibility is increased by having the front portion of the ski relatively thin compared to the middle portion and, as a loop for manually moving a snowmobile and displacing obstacles, utilizing the snowmobile ski flexing apparatus of U.S. Pat. No. 5,360,220. This is a flexible loop with its first end attached to the bottom of the front portion of the ski and its second end slidably attached to the top of the ski so that the flexible loop curves in front of and above the snowmobile ski. Unlike the loop of that application, however, the bottom of the front portion has a channel to accommodate the first end of the loop so that when such first end is attached, it is flush with the bottom of the front portion of the ski. This requires increasing the thickness of the ski above the channel. The flexibility of prior art skis is impaired by having both ends of the loop rigidly attached to the ski, as can be seen in U.S. Pat. Nos. 5,145,201; 5,040,818; and 3,734,221 .

Smooth reverse movement is augmented by placing, on each side of the ski near the juncture of the middle portion and the rear portion of the ski, a rear-facing vertical wedge with its apex at the bottom of the rear portion of the ski.

Fluid dynamic drag is reduced by shaping the base of the ski to enhance the smoothness of the flow as snow exits the ski. This is achieved, as the sides of the ski rise near the juncture between the middle portion and the rear portion of the ski, by having the sides rise in such a manner that, as viewed from below, on each side of the ski the rising side forms a rear-facing horizontal wedge with its apex on the edge of the ski.

And structural strength is improved by increasing the thickness at the top of the middle portion of the ski, as compared to the front portion and rear portion of the ski.

DESCRIPTION OF THE PREFERRED EMBODIMENT

The preferred embodiment combines the preceding novel features with the desirable characteristics of prior art skis.

Figures 1, 2:
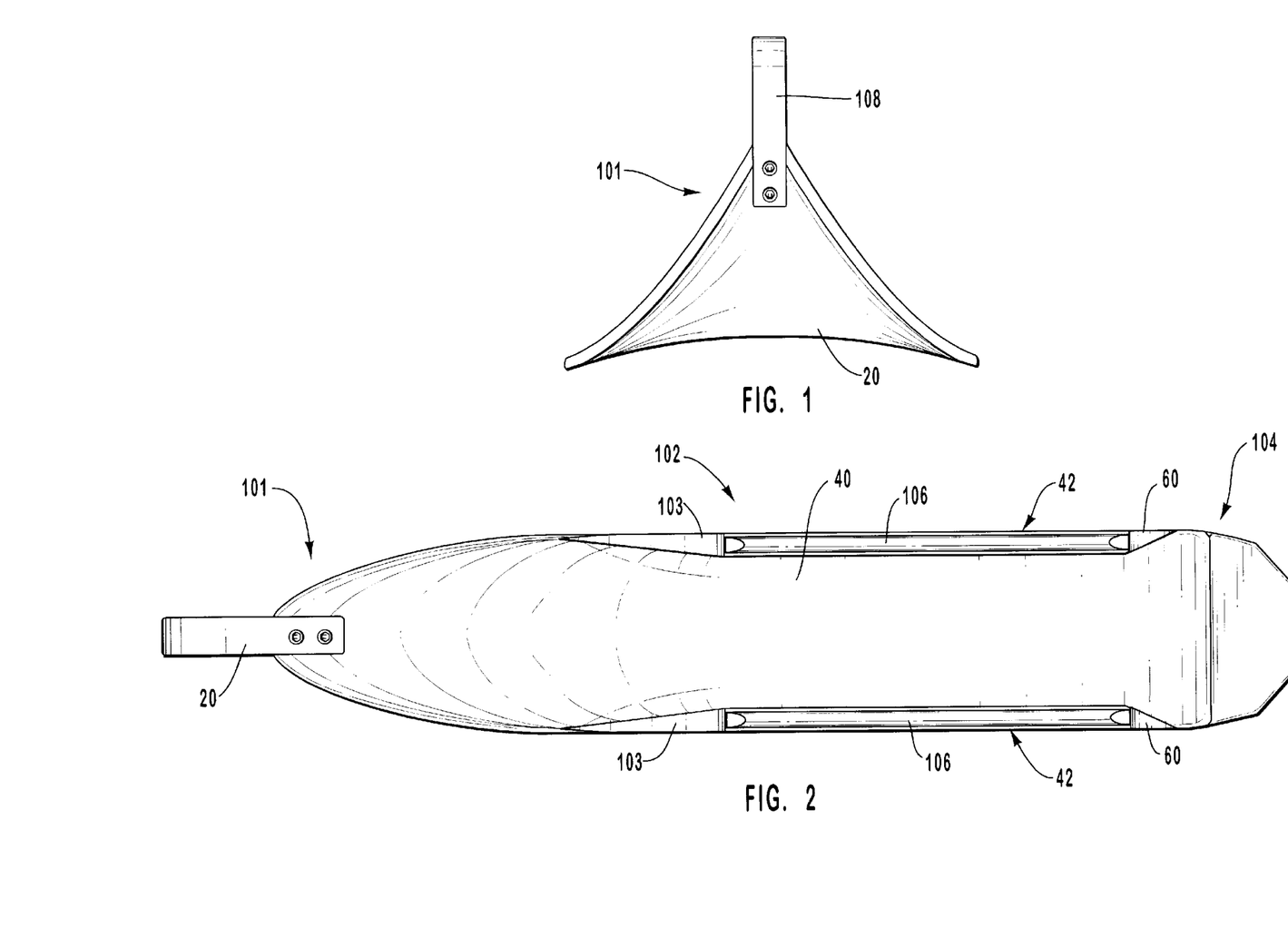
FIG. 1 is a slightly elevated view from the front of the snowmobile ski, to show the slightly concave bottom of the upwardly curved front portion of the ski.
FIG. 2 is a view of the bottom of the snowmobile ski.
Figure 1:
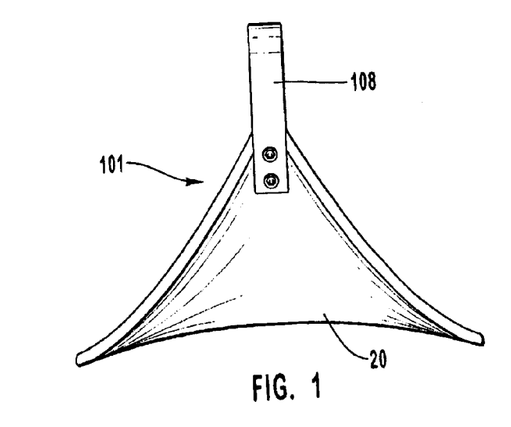
Figure 2:
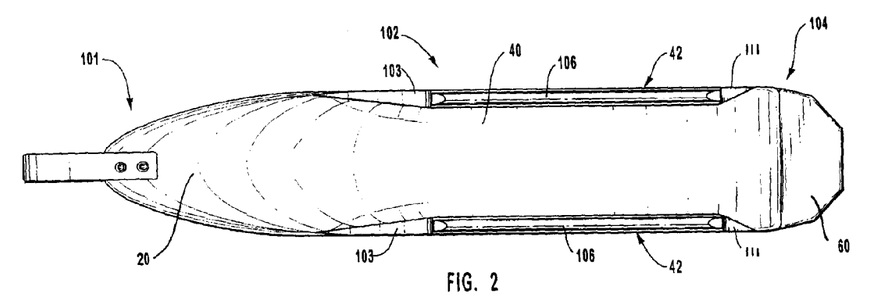

The bottom, designated the front bottom (20), of the front portion (101) of the snowmobile ski is, as shown in FIG. 1, concave, preferably slightly concave. Near the juncture of the front portion (101) and the middle portion (1.02) of the snowmobile ski, the sides of the snowmobile ski begin to extend downward to create longitudinal side portions (42) in such a manner that, as viewed from below in FIG. 2, on each side of the snowmobile ski the downwardly extending longitudinal side portion (42) has attached to its front end a forward-facing horizontal wedge (103) with its apex on the edge of the snowmobile ski so that the forward-facing horizontal wedge (103) is attached to the front of the downwardly extending longitudinal side portion (42), to the middle portion (102) of the ski, and to the front portion (101) of the ski. These features funnel snow to a channel formed by the bottom of the middle portion (102) of the snowmobile ski to enhance flotation as the snowmobile ski travels across snow.

Figure 4:
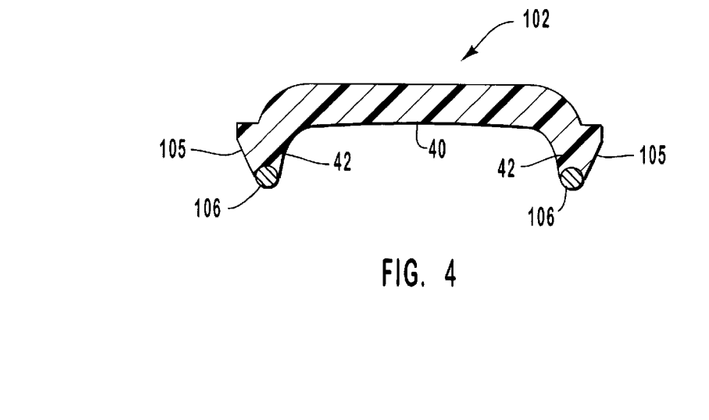
FIG. 4 presents a sectional view looking to the rear of the snowmobile ski from the position designated by line 4—4 in FIG. 3.
Figure 5:
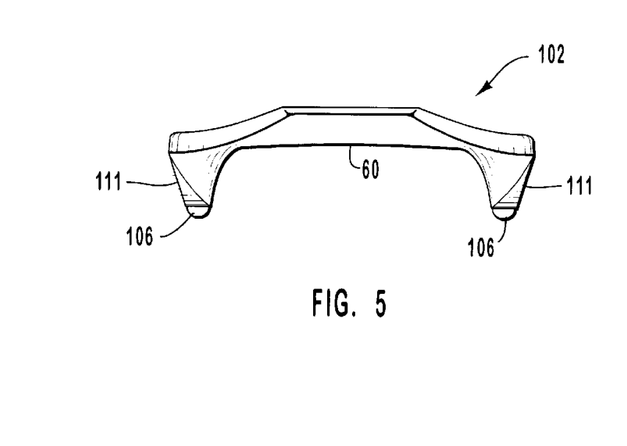
FIG. 5 is a view looking forward from behind the snowmobile ski.

The snowmobile ski's having a flat middle bottom (40), as depicted in FIG. 4, and rear bottom (60), as portrayed in FIG. 5, also aids flotation on snow, as, by preventing snow from being forced outward from the sides of the snowmobile ski when weight is placed on such ski, do to the downwardly extending longitudinal side portions (42). As suggested above, the middle bottom (40) is substantially planar while the two opposite longitudinal side portions (42) of the ski extend downwardly. The importance lies in that the side portions (42) extend downwardly relative to the center portion of the ski, i.e., the longitudinal center portion.

Figure 3:
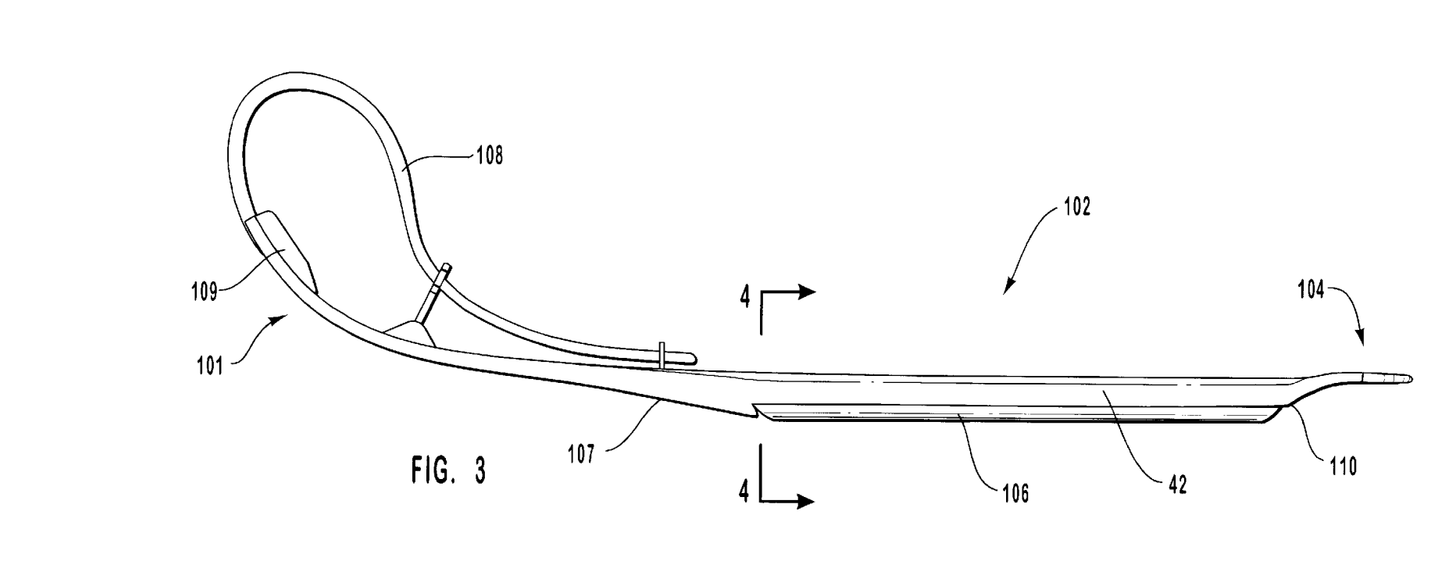
FIG. 3 provides a lateral view of the snowmobile ski.

The downwardly extending longitudinal side portions (42) of the snowmobile are located along only the middle portion (102) of the snowmobile ski, as is evident in FIG. 3. Limiting the downwardly extending longitudinal side portions (42) to the middle portion (102) of the snowmobile ski reduces resistance to yawing, i.e., laterally turning the ski. For this same reason, efficient turning is facilitated by the following facts the front portion (101) of the snowmobile ski curves upward, as shown in FIG. 1 and FIG. 3; and that the rear bottom (60) is flat until the rear portion (104) of the snowmobile ski curves upward, as depicted in FIG. 3 and FIG. 5.

As the downwardly extending longitudinal side portions (42) descend, the outside wall (105) of each such downwardly extending longitudinal side portion (42) tapers inward, as illustrated in FIG. 4. Such a taper has less of a tendency than would a sharp angle between the downwardly extending longitudinal side portion (42) and the middle bottom (40)—to cut into snow as the snowmobile ski rolls slightly during its turn and, therefore, assists the ski to float during a turn. Moreover, the downwardly extending longitudinal side portions (42) keep snow from sliding away to the side as the ski is rolled slightly for a turn to create—from the weight of the snowmobile and the user—a horizontal component of force to aid in turning the snowmobile.

Finally, with respect to turning, a metal guide rod (106) is attached, as portrayed in FIG. 2, FIG. 3, FIG. 4, and FIG. 5, to, and runs longitudinally along, the bottom of each of the downwardly extending longitudinal side portions (42) at the edge of the bottom of the downwardly extending longitudinal side portion (42). As indicated above, the guide rod (106) increases the effectiveness of the frictional turning process created by yawing the ski. This process is most applicable to turning on ice or hard-packed snow since when the ski rolls, it cannot have the edge in the direction of the turn roll into the ice or snow. Rather, the ski is rolled onto the edge in the direction of the turn with the other edge elevated above the ice or snow. Thus, unless the guide rod (106) is at the edge of the ski, no guide rod (106) will contact the ground during the turn.

To facilitate smooth forward movement of the snowmobile ski, on each side of the ski near the juncture of the front portion (101) and the middle portion (102) is located a forward-facing vertical wedge (107) with its apex on the bottom of the front portion (101) approximately at the point where the front portion (101) of the ski begins to curve upward. As can be seen from FIG. 3, the forward-facing vertical wedge (107) is connected to the front of the downwardly extending longitudinal side portion (42), to the middle portion (102) of the ski, and to the front portion (101) of the ski. A comparison of FIG. 2 with FIG. 3 shows that the forward-facing vertical wedge (107) is also attached to the forward-facing horizontal wedge (103) that is on the same side of the ski as the forward-facing vertical wedge (107).

Flexibility of the ski is increased by making the front portion (101) of the snowmobile ski relatively thin compared to the middle portion (102) and utilizing a flexible loop (108) as the frontal loop that is well known in the art for manually moving a snowmobile and displacing low-lying obstacles encountered during the operation of the snowmobile. The first end of the flexible loop (108) is attached to a channel in the tip of the front bottom (20) of the snowmobile ski so that the bottom of the flexible (108) is flush with the front bottom (20) of the ski, as depicted in FIG. 1. To accommodate the channel in the relatively thin front portion (101) of the snowmobile ski, an upper projection (109) is attached to the top of the tip of the front portion (101) of the ski. The second end of the flexible loop (108) is slidably attached to the top of the front portion (101) of the snowmobile ski so that the flexible loop (108) curves in front of and above the ski.

Smooth reverse movement of the snowmobile ski is achieved by locating on each side of the ski near the juncture of the middle portion (102) and the rear portion (104) a rear-facing vertical wedge (110) with its apex on the bottom of the rear portion (104) of the ski such that the rear-facing vertical wedge (110) is attached to the rear end of the downwardly extending longitudinal side portion (42), to the middle portion (102) of the ski, and to the rear portion (104) of the ski, as shown in FIG. 3. Such movement is also augmented by the fact that the rear portion (104) of the snowmobile ski curves upward, as seen in FIG. 3 and FIG. 5, and that the corners of the rear portion (104) of the ski, as viewed from below in FIG. 2, are rounded.

Of course, the middle portion (102) of the snowmobile ski is attached to the back of the front portion (101) of the ski; and the rear portion (104) of the ski is attached to the back of the middle portion (102) of the ski.

As mentioned above, fluid dynamic drag is reduced by shaping the base of the ski to enhance the smoothness of the flow as snow exits the ski. Near the juncture between the middle portion (102) of the ski and the rear portion (104) of the ski, the sides of the ski rise in such a manner that, as viewed from below in FIG. 2, on each side of the ski the downwardly extending longitudinal side portion (42) has attached to its back end a rear-facing horizontal wedge (111) with its apex on the edge of the ski so that the rear-facing horizontal wedge (111) is also attached to the middle portion (102) of the ski and to the rear portion (104) of the ski. A comparison of FIG. 2 and FIG. 3 demonstrates that the rear-facing horizontal wedge (111) is additionally attached to the rear-facing vertical wedge (110) that is on the same side of the ski as the rear-facing horizontal wedge (111).

The previously discussed upward curve of the rear portion (104) of the snowmobile ski, as well as the fact that the corners of the rear portion (104) of the ski are rounded, also contributes to a reduction in fluid dynamic drag.

Structural strength of the snowmobile ski is improved by the downwardly extending longitudinal side portions (42) and by the fact that, as compared to the front portion (101) and rear portion (104) of the ski, the thickness of the snowmobile ski is increased in the middle portion (102), as depicted in FIG. 3 and FIG. 4.

I claim:

1. A snowmobile ski, comprising:
    a base extending in a longitudinal direction and having a bottom for moving over snow, the base also extending in a lateral direction between a first edge and a second edge thereof and having a top adapted to be connected to a snowmobile;
    a first side portion extending in the longitudinal direction and extending downward from the first edge;
    a second side portion extending in the longitudinal direction and extending downward from the second edge;
    a first guide rod disposed on a bottom of the first side portion; and
    a second guide rod disposed on a bottom of the second side portion.

2. A snowmobile ski as recited in claim 1, wherein the bottom and the first and second side portions are adapted to provide a channel for the passage of snow, bounded by the bottom and the first and second side portions.

3. A snowmobile ski as recited in claims 2, wherein the first and second side portions are adapted to funnel snow into the channel.

4. A snowmobile ski as recited in claim 2, wherein the first side portion has a forward apex at the first edge and the second side portion has a forward apex at the second edge, and wherein each of the first and second side portions increases in width laterally from the respective forward apexes rearward, so as to funnel snow into the channel.

5. A snowmobile ski as recited in claim 2, wherein the first side portion has a rear apex at the first edge and the second side portion has a rear apex at the second edge, and wherein each of the first and second side portions decreases in width laterally toward the respective rear apexes so as to decrease fluid dynamic drag.

6. A snowmobile ski as recited in claim 2, wherein the base further comprises an upturned front portion having a front portion bottom, and further comprising a concavity in the front portion bottom, such that snow is funneled past the front portion into the channel when the snowmobile ski is in use.

7. A snowmobile ski as recited in claim 1, wherein the base is flexible and substantially flat laterally across the top, and wherein the base transitions between a front portion, a rear portion, and an intervening middle portion and has a vertical thickness that increases from the front portion to the middle portion, such that the flexibility of the base is greater at the front portion than at the middle portion.

8. A snowmobile ski as recited in claim 7, wherein the first and second side portions extend exclusively along the middle portion.

9. A snowmobile ski as recited in claim 1, wherein the first and second side portions have a front and a rear, taper downward from the base at the front, and taper upward toward the base at the rear.

10. A snowmobile ski, comprising:
    a base extending in a longitudinal direction and having a bottom for moving over snow, the base also extending in a lateral direction between a first edge and a second edge thereof and having a top adapted to be connected to a snowmobile;
    a first side portion extending downward from the first edge and extending in the longitudinal direction;
    a second side portion extending downward from the second edge and extending in the longitudinal direction, the first and second side portions having a front and a rear and tapering downward from the base at the front and tapering upward toward the base at the rear;

a first guide rod disposed on a bottom of the first side portion; and a second guide rod disposed on a bottom of the second side portion.

11. A snowmobile ski as recited in claim 10, wherein the bottom and the first and second side portions are adapted to provide a channel for the passage of snow bounded by the bottom and the first and second side portions.

12. A snowmobile ski as recited in claim 7, wherein the base further comprises an upturned front portion having a front portion bottom, and further comprising a concavity in the front portion bottom, such that snow is funneled past the front portion into the channel when the snowmobile ski is in use.

13. A snowmobile ski as recited in claim 12, wherein the first side portion has a forward apex at the first edge and the second side portion has a forward apex at the second edge, and wherein each of the first and second side portions increases in width laterally from the respective forward apexes rearward, so as to funnel snow into the channel.

14. A snowmobile ski as recited in claim 13, wherein the first side portion has a rear apex at the first edge and the second side portion has a rear apex at the second edge, and wherein each of the first and second side portions decreases in width laterally toward the respective rear apexes so as to decrease fluid dynamic drag.

15. A snowmobile ski as recited in claim 14, wherein the base is flexible and substantially flat laterally across the top, and wherein the base transitions between a front portion, a rear portion, and an intervening middle portion and has a vertical thickness that increases from the front portion to the middle portion, such that the flexibility of the base is greater at the front portion than at the middle portion.

16. A snowmobile ski, comprising:

a base extending in a longitudinal direction and having a bottom for moving over snow, the base extending in a lateral direction between a first edge and a second edge thereof and having a top adapted to connect to a snowmobile;

a first side portion extending in the longitudinal direction and extending downward from the first edge;

a second side portion extending in the longitudinal direction and extending downward from the second edge;

a first guide rod disposed to extend along a bottom of the first side portion;

a second guide rod disposed to extend along a bottom of the second side portion; and wherein the bottom and the first and second side portions are adapted to provide a channel for the passage of snow bounded by the bottom and the first and second side portions; and wherein the first side portion has a forward apex at the first edge and the second side portion has a forward apex at the second edge, and wherein each of the first and second side portions increases in width laterally from the respective forward apexes rearward, so as to funnel snow into the channel.

17. A snowmobile ski as recited in claims 16, wherein the base further comprises an upturned front portion having a front portion bottom, and further comprising a concavity in the front portion bottom, such that snow is funneled past the front portion into the channel when the snowmobile ski is in use.

18. A snowmobile ski as recited in claim 17, wherein the base is flexible and substantially flat laterally across the top, and wherein the base transitions between a front portion, a rear portion, and an intervening middle portion and has a vertical thickness that increases from the front portion to the middle portion, such that the flexibility of the base is greater at the front portion than at the middle portion.

19. A snowmobile ski as recited in claim 18, wherein the first and second side portions extend exclusively along the middle portion.

20. A snowmobile ski as recited in claim 19, wherein the first and second side portions have a front and a rear, taper downward from the base at the front, and taper upward toward the base at the rear.

* * * * *

UNITED STATES PATENT AND TRADEMARK OFFICE
CERTIFICATE OF CORRECTION

PATENT NO. : 5,836,594
DATED : November 17, 1998
INVENTOR(S) : Simmons

It is certified that error appears in the above-identified patent and that said Letters Patent is hereby corrected as shown below:

Title page showing illustrative figure, should be deleted and substitute therefor the attached title page.

Delete Drawing sheet 1, and substitute therefor the Drawing sheet consisting of Figs. 1 and 2 as shown on the attached page.

Signed and Sealed this

First Day of November, 2005

JON W. DUDAS
*Director of the United States Patent and Trademark Office*

United States Patent [19]
Simmons

[11] Patent Number: 5,836,594
[45] Date of Patent: *Nov. 17, 1998

[54] SNOWMOBILE SKI

[75] Inventor: Verlin M. Simmons, Providence, Utah

[73] Assignee: Simmons, Inc., Provident, Utah

[*] Notice: This patent issued on a continued prosecution application filed under 37 CFR 1.53(d), and is subject to the twenty year patent term provisions of 35 U.S.C. 154(a)(2).

[21] Appl. No.: 213,950

[22] Filed: Mar. 15, 1994

Related U.S. Application Data

[63] Continuation-in-part of Ser. No. 88,411, Jul. 1, 1993, Pat. No. 5,360,220, which is a continuation-in-part of Ser. No. 988,231, Dec. 9, 1992, abandoned.

[51] Int. Cl.$^6$ .................................................. B62B 17/00
[52] U.S. Cl. ........................................................ 280/28
[58] Field of Search ............................. 280/28, 845, 608, 280/609

[56] References Cited

U.S. PATENT DOCUMENTS

| | | | |
|---|---|---|---|
| 3,675,939 | 7/1972 | Vik | 280/28 |
| 3,785,448 | 1/1974 | Merenheimo et al. | 280/28 X |
| 3,817,544 | 6/1974 | Labelle | 280/28 |
| 3,844,367 | 10/1974 | Flohr | 280/28 X |
| 3,901,525 | 8/1975 | O'Brien et al. | 280/14 |
| 4,116,455 | 9/1978 | Dotson et al. | 280/7.12 |
| 4,869,336 | 9/1989 | Nakaski et al. | 280/28 X |
| 5,344,168 | 9/1994 | Olson et al. | 280/28 |
| 5,360,220 | 11/1994 | Simmons | 280/28 |

FOREIGN PATENT DOCUMENTS

| | | | |
|---|---|---|---|
| 396225 | 4/1909 | France | 280/28 |
| 2662610 | 12/1991 | France | 280/28 |

*Primary Examiner*—Richard M. Camby
*Attorney, Agent, or Firm*—Madson & Metcalf

[57] ABSTRACT

A snowmobile ski having a front portion the bottom of which is slightly concave. On each side of the middle portion of the snowmobile ski there is a downwardly extending longitudinal side portion. At the front of each downwardly extending longitudinal side portion are located a forward-facing horizontal wedge and a forward-facing vertical wedge. At the rear of each downwardly extending longitudinal side portion are placed a rear-facing horizontal wedge and a rear-facing vertical wedge. A flexible loop is attached to, and mounted flush with, the bottom of the front portion of the snowmobile ski. The flexible loop curves in front of, and above, the front portion of the snowmobile ski, before being slidably attached to the top of the front portion of the snowmobile ski. The middle portion of the snowmobile ski is thicker than either the front portion or the rear portion of the snowmobile ski.

20 Claims, 2 Drawing Sheets

FIG. 2

UNITED STATES PATENT AND TRADEMARK OFFICE
CERTIFICATE OF CORRECTION

PATENT NO. : 5,836,594
DATED : November 17, 1998
INVENTOR(S) : Simmons, V.

It is certified that error appears in the above-identified patent and that said Letters Patent is hereby corrected as shown below:

Title page,
Item [63], Related U.S. Application Data, delete "which is" and insert -- and --.

Column 1,
Line 7, delete "which is" and insert -- and --.

Signed and Sealed this

Fourteenth Day of February, 2006

JON W. DUDAS
*Director of the United States Patent and Trademark Office*